US012562309B2

(12) United States Patent
Yan et al.

(10) Patent No.: US 12,562,309 B2
(45) Date of Patent: Feb. 24, 2026

(54) INTEGRATED TRANSFORMER WITH A CURED MAGNETIC CORE PIECE

(71) Applicant: Texas Instruments Incorporated, Dallas, TX (US)

(72) Inventors: Yi Yan, San Jose, CA (US); Zhemin Zhang, Allen, TX (US); Yuki Sato, Tokyo (JP); Kenji Otake, Nagano (JP); Vijaylaxmi Khanolkar, Pune (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 9 days.

(21) Appl. No.: 18/427,734

(22) Filed: Jan. 30, 2024

(65) Prior Publication Data

US 2024/0170207 A1 May 23, 2024

Related U.S. Application Data

(62) Division of application No. 16/904,875, filed on Jun. 18, 2020, now Pat. No. 11,887,776.

(51) Int. Cl.
*H01F 41/04* (2006.01)
*H01F 27/28* (2006.01)

(52) U.S. Cl.
CPC ....... *H01F 41/041* (2013.01); *H01F 27/2804* (2013.01)

(58) Field of Classification Search
CPC .. H01F 41/041; H01F 27/2804; H01F 27/255; H01F 41/046
See application file for complete search history.

(56) References Cited

U.S. PATENT DOCUMENTS 5,655,287 A 8/1997 Ushiro
6,320,490 B1 * 11/2001 Clayton ................. H01F 30/10 336/84 R (Continued)

FOREIGN PATENT DOCUMENTS

EP 3605564 A1 5/2020
GB 1603386 A 5/1978

(Continued)

OTHER PUBLICATIONS

Park et al., "Ferrite-Based Integrated Planar Inductors and Transformers Fabricated at Low Temperature" IEEE Transactions on Magnetics, vol. 33, No. 5, Sep. 1997, pp. 3322-3324.

(Continued)

*Primary Examiner* — Jeffrey T Carley
*Assistant Examiner* — Jose K Abraham
(74) *Attorney, Agent, or Firm* — Ronald O. Neerings; Frank D. Cimino

(57) ABSTRACT

A method includes performing a printing process that deposits a magnetic paste onto a first side and into an opening of a laminate; curing the magnetic paste to form a first transformer core piece having a first portion along the first side and a second portion filling the opening of the laminate; joining a second transformer core piece to a side of the second portion of the first transformer core piece to form a transformer. A transformer includes a laminate; a first core piece; and a second core piece, the first core piece comprising: a cured magnetic paste, a first portion along a side of the laminate, and a second portion filling an opening of the laminate, the second core piece extending along a side of the second portion of the first transformer core piece, and the laminate having windings that encircle the opening.

25 Claims, 9 Drawing Sheets

(56) References Cited

U.S. PATENT DOCUMENTS

| | | | | |
|---|---|---|---|---|
| 6,914,508 | B2 * | 7/2005 | Ferencz | H01F 27/2804 336/200 |
| 8,466,764 | B2 * | 6/2013 | Bogert | H01F 5/003 336/83 |
| 10,199,154 | B2 | 2/2019 | Hong et al. | |
| 2003/0076211 | A1 * | 4/2003 | Matsuta | H01F 27/2804 336/200 |
| 2006/0119461 | A1 * | 6/2006 | Kawarai | H01F 17/043 336/200 |
| 2006/0186978 | A1 * | 8/2006 | Kawarai | H01F 41/127 336/83 |
| 2006/0186979 | A1 * | 8/2006 | Kawarai | H01F 41/127 336/83 |
| 2013/0321117 | A1 * | 12/2013 | Park | H01F 27/2804 336/200 |
| 2014/0036464 | A1 * | 2/2014 | Kilger | H01L 24/03 361/767 |
| 2014/0152398 | A1 | 6/2014 | Kayahara | |
| 2015/0099115 | A1 | 4/2015 | Maeda et al. | |
| 2016/0055958 | A1 | 2/2016 | Chen et al. | |
| 2017/0365386 | A1 | 12/2017 | Arai et al. | |
| 2018/0166199 | A1 | 6/2018 | Hachiya et al. | |
| 2019/0019618 | A1 * | 1/2019 | Fukui | H01F 27/2804 |
| 2019/0088409 | A1 | 3/2019 | Morita et al. | |
| 2019/0195294 | A1 | 6/2019 | Kim et al. | |
| 2019/0198436 | A1 | 6/2019 | Vadlamani et al. | |
| 2019/0252107 | A1 * | 8/2019 | Eom | H01F 27/2885 |
| 2020/0005990 | A1 | 1/2020 | Paital et al. | |
| 2020/0005994 | A1 | 1/2020 | Lee et al. | |
| 2020/0035396 | A1 | 1/2020 | Weis | |
| 2020/0043878 | A1 | 2/2020 | Komatsu et al. | |
| 2020/0105453 | A1 | 4/2020 | Yan et al. | |
| 2020/0135381 | A1 | 4/2020 | Yan et al. | |
| 2020/0152371 | A1 * | 5/2020 | Zhai | H01F 27/2804 |
| 2021/0233698 | A1 | 7/2021 | Takahashi et al. | |

FOREIGN PATENT DOCUMENTS

| | | | | |
|---|---|---|---|---|
| JP | 2010080594 | A | 4/2008 | |
| JP | 2008300734 | A | 12/2008 | |
| WO | WO-2019009599 | A1 * | 1/2019 | H01F 27/2847 |
| WO | WO-2019235510 | A1 * | 12/2019 | H01F 27/292 |

OTHER PUBLICATIONS

Brandon et al., "Printed Microinductors on Flexible Substrates for Power Applications" IEEE Transactions on Components and Packaging Technologies, vol. 26, No. 3, Sep. 2003, pp. 517-523.

Aliza Mizrachi, "Substrate Materials" www.incoseil.org, 66 pages.

International Search Report dated Sep. 16, 2021.

* cited by examiner

INTEGRATED TRANSFORMER WITH A CURED MAGNETIC CORE PIECE

CROSS-REFERENCE TO RELATED APPLICATIONS

The present application is a divisional of co-pending application Ser. No. 16/904,875 filed Jun. 18, 2020, titled “Integrated Transformer with Printed Core Piece”, now U.S. Pat. No. 11,887,776 and is incorporated herein by reference in its entirety.

BACKGROUND INFORMATION

The subject matter disclosed herein relates to integrating transformers into integrated circuits or other packaged electronic devices. Wire wound transformers provide electrical isolation with good performance, but these devices are large and expensive. In power supplies and other applications, it is desirable to reduce the cost and size of magnetic components and to integrate isolation transformers into a packaged electronic device or module with a small footprint, while providing high isolation voltage ratings. Magnetic films can be added on the top and bottom of a lamination with conductive windings separated by an isolation barrier to improve performance of an integrated air core transformer with a small footprint. However, this approach suffers from AC winding loss due to fringing effects caused by the airgap between two magnetic plates, which limits power delivery capability through the transformer. A lamination can also be assembled within magnetic core structures to provide an isolated closed magnetic loop transformer. However, assembling the components with interconnecting material introduces and traps air bubbles or other voids which inhibit achievement of the desired isolation performance rating of the transformer.

BRIEF DESCRIPTION

One aspect of the present disclosure provides a method. The method comprises performing a printing process that deposits a magnetic paste onto a first side of a laminate structure using a stencil. The printing process deposits the magnetic paste into and fills an opening that extends from the first side of the laminate structure to an opposite second side of the laminate structure. The method also comprises curing the magnetic paste to form a first transformer core piece having: a first portion that extends along the first side of the laminate structure, and a second portion that fills the opening of the laminate structure, and joining a second transformer core piece to a side of the second portion of the first transformer core piece to form a transformer.

In one example, performing the printing process deposits the magnetic paste into and fills multiple openings that respectively extend from the first side of the laminate structure to the second side of the laminate structure. In one implementation, the laminate structure includes windings that encircle the opening or one or more openings of the laminate structure.

In one example, the second transformer core piece is joined to the side of the second portion of the first transformer core piece by depositing a second magnetic paste onto a first side of the second transformer core piece, positioning the side of the second portion of the first transformer core piece on the second magnetic paste, and curing the second magnetic paste to join the second transformer core piece to the side of the second portion of the first transformer core piece.

One example further comprises joining the second transformer core piece to a lead frame before joining the second transformer core piece to the side of the second portion of the first transformer core piece. In one implementation, the second transformer core piece is joined to the lead frame by depositing a third magnetic paste onto a side of the lead frame, positioning a second side of the second transformer core piece on the third magnetic paste, and curing the third magnetic paste to join the second side of the second transformer core piece to the lead frame. In one example, the method further comprises joining the second transformer core piece to the second side of the laminate structure while joining the second transformer core piece to the side of the second portion of the first transformer core piece.

In another aspect, a transformer comprises a laminate structure and first and second core pieces. The laminate structure has a first side, an opposite second side, an opening that extends from the first side of the laminate structure to the second side of the laminate structure, and windings that encircle the opening. The first transformer core piece has a first portion that extends along the first side of the laminate structure, and a second portion that fills the opening of the laminate structure, and the first transformer core piece comprises a cured magnetic paste. The second transformer core piece extends along a side of the second portion of the first transformer core piece. In one example, the transformer further comprises a second cured magnetic paste between a first side of the second transformer core piece and the side of the second portion of the first transformer core piece. In another example, the first transformer core piece has an E-shape. In one example, the first transformer core piece has a T-shape. In another example, the first transformer core piece has a U-shape.

A further aspect provides an electronic device that comprises a transformer, and package structure, and conductive leads. The transformer comprises a laminate structure, a first transformer core piece, and a second transformer core piece. The first transformer core piece comprises a cured magnetic paste, a first portion that extends along a side of the laminate structure, and a second portion that fills an opening of the laminate structure. The second transformer core piece extends along a side of the second portion of the first transformer core piece, and the laminate structure comprises windings that encircle the opening. The package structure encloses the transformer, and the conductive leads are electrically coupled to the transformer. In one example, the transformer further comprises a second cured magnetic paste between a first side of the second transformer core piece and the side of the second portion of the first transformer core piece. In one example, the first transformer core piece has an E-shape. In another example, the first transformer core piece has a T-shape. In another example, the first transformer core piece has a U-shape.

DETAILED DESCRIPTION

Figure 1:
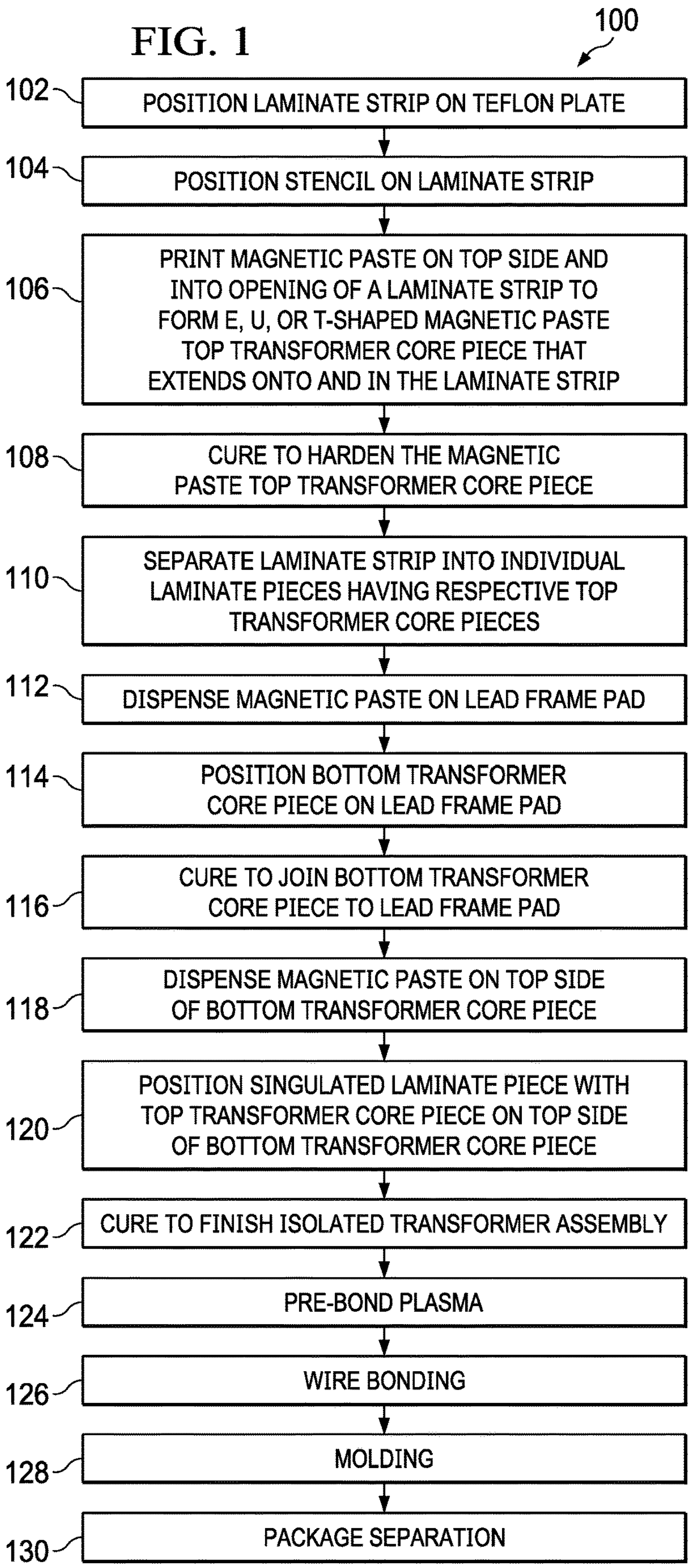
FIG. 1 is a flow diagram showing a method for manufacturing an electronic device with an integrated transformer.

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections.

Figure 2:
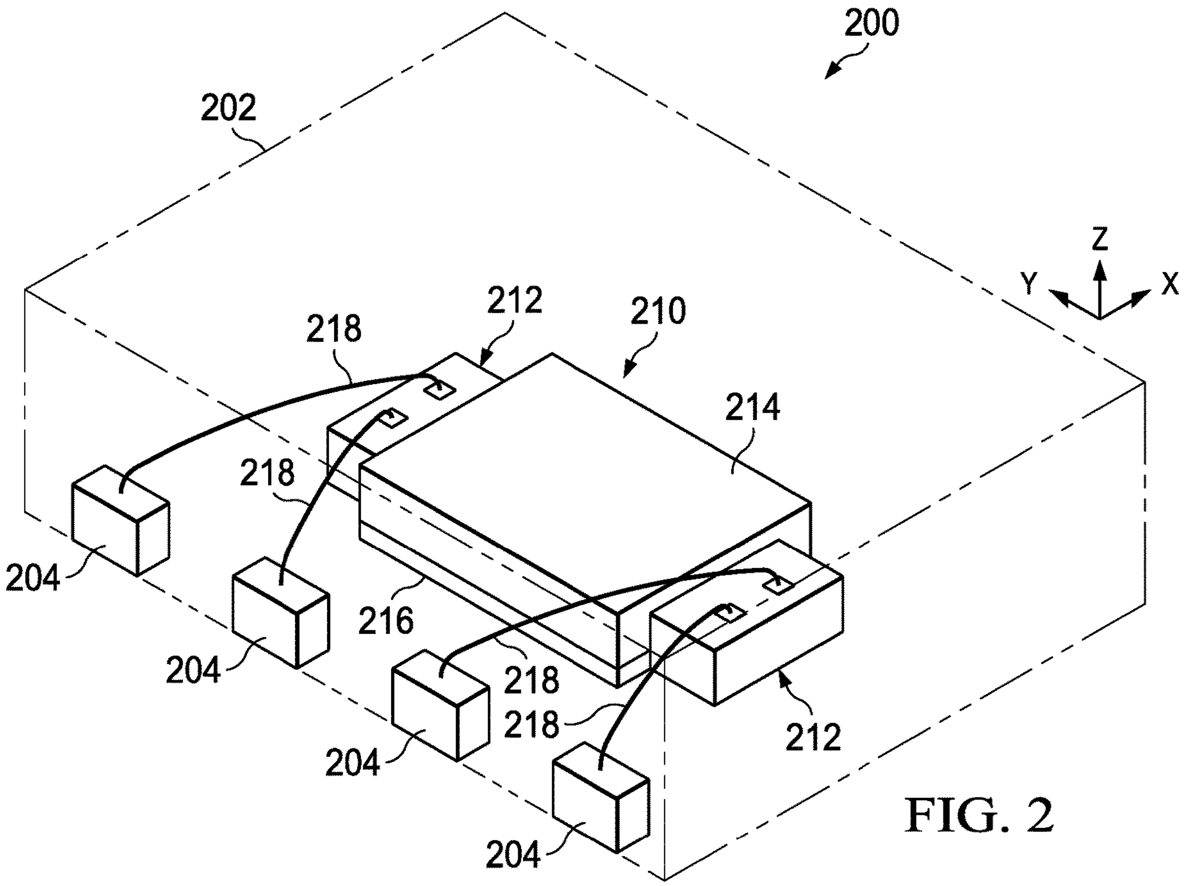
FIG. 2 is a perspective view of a packaged electronic device with an integrated transformer.

Referring to FIGS. 1 and 2, FIG. 1 shows a method 100 according to one aspect of the disclosure. In one implementation, the method 100 of FIG. 1 is performed to manufacture an electronic device with an integrated transformer shown in FIG. 2, and FIGS. 3-18 show the device of FIG. 2 at various stages of fabrication according to the method 100.

The method 100 begins with positioning a laminate strip on a Teflon plate or other carrier structure at 102, and a stencil is positioned on the laminate strip at 104. The method 100 further includes printing a magnetic paste (e.g., ferrite paste) on a top side of, and into an opening of, the laminate strip at 106 to form an E, U, or T-shaped magnetic paste top transformer core piece (also referred to hereinafter as a first transformer core piece) that extends on and into laminate strip. At 108, the method 100 further includes curing, such as by a thermal heating process, to harden the magnetic paste top transformer core piece. The method 100 further includes separating the laminate strip at 110 into individual laminate pieces having respective top transformer core pieces.

At 112, the method 100 includes dispensing magnetic paste on a lead frame pad. At 114, the method 100 further includes positioning a bottom transformer core piece (also referred to hereinafter as a second transformer core piece) on the lead frame pad, for example, over the dispensed magnetic paste. At 116, the method 100 further includes curing, such as by a thermal heating process, to harden the magnetic paste to join the bottom transformer core piece to the lead frame pad.

The method 100 further includes dispensing magnetic paste at 118 on a top side of the bottom transformer core piece, as well as positioning a singulated laminate piece with a top transformer core piece on the top side of the bottom transformer core piece at 120. At 122, the method 100 further includes curing, such as by a thermal heating process, to finish the isolated transformer assembly. A pre-bond plasma treatment is performed at 124 in one example. At 126, the method 100 further includes wire bonding. The method 100 further includes molding at 128, and package separation at 130.

FIG. 2 shows a packaged electronic device 200 having a transformer with an E-I core structure. The electronic device 200 includes a molded package structure 202 and conductive leads 204 with outer sides or surfaces that are exposed outside the package structure 202. The electronic device 200 includes a transformer 210 at least partially enclosed by the package structure 202. The transformer 210 includes a laminate structure 212, a first transformer core piece 214, and a second transformer core piece 216. The electronic device 200 includes bond wires 218 that electrically couple respective ones of the conductive leads 204 to the transformer 210. The first (e.g., top) transformer core piece 214 is or includes a cured magnetic paste 214 (e.g., printed at 106 and cured at 108 in FIG. 1 above, where the uncured magnetic paste printed at 106 is also referred to herein as 214).

In one example, the first transformer core piece 214 includes a first portion that extends along a side of the laminate structure 212, and a second portion that fills an opening of the laminate structure 212, for example, to form a core leg of a T or U or E-shaped core piece. The second transformer core piece 216 extends along a side of the second portion of the first transformer core piece 214. The laminate structure 212 in one example includes primary and secondary windings that encircle the opening, for example, to magnetically couple primary and secondary transformer windings with a magnetic circuit formed by the first transformer core piece 214 and the second transformer core piece 216.

FIGS. 3-18 show the electronic device 200 having a transformer with an E-I core structure, undergoing fabrication processing according to the method 100 of FIG. 1.

Figure 3:
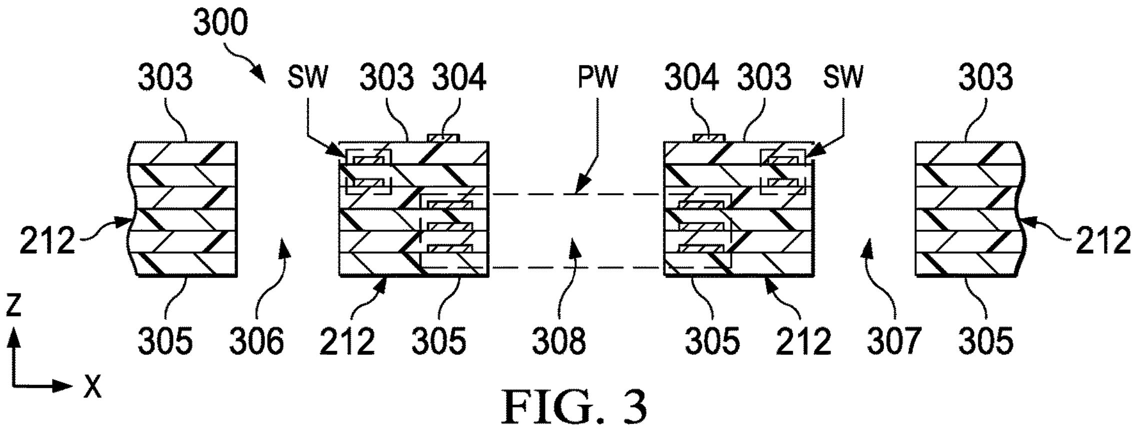
FIG. 3 is a partial sectional side view of a laminate strip with transformer windings taken along line 3-3 of FIG. 4.
Figure 4:
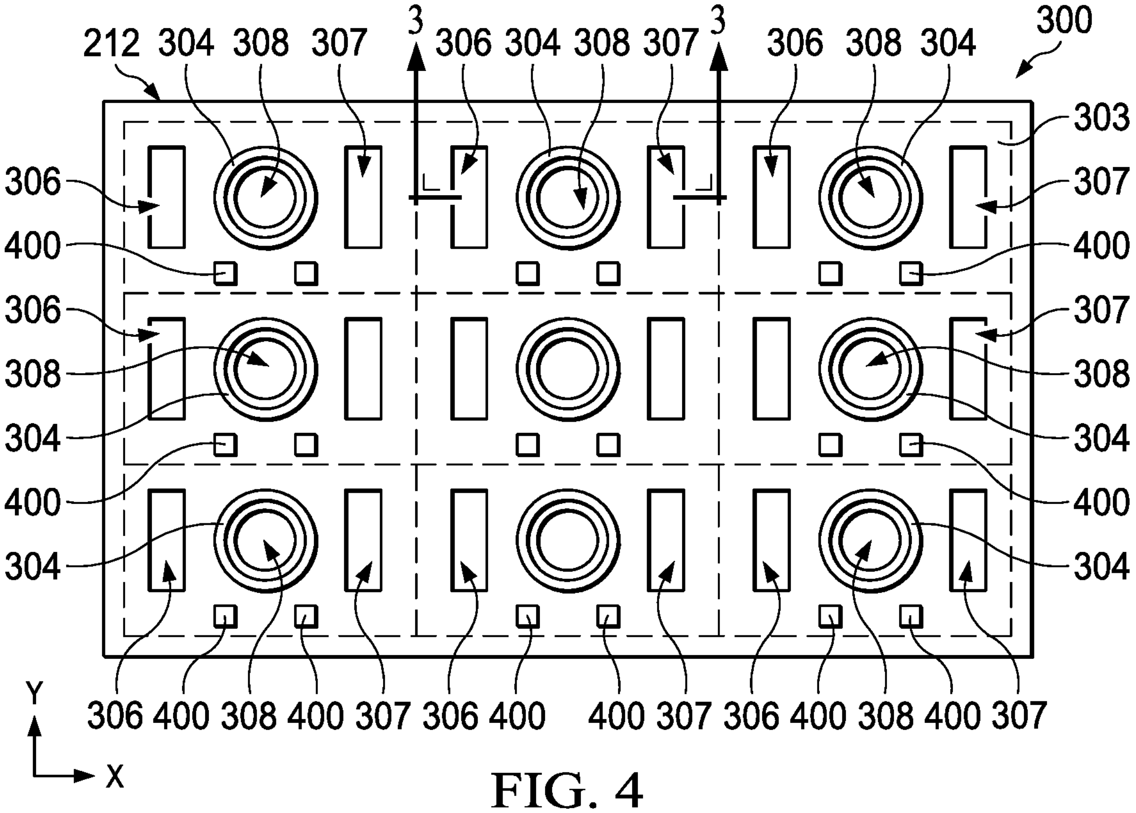
FIG. 4 is a top plan view of the laminate strip of FIG. 3.

FIGS. 3 and 4 respectively show partial sectional side and top plan views of the laminate structure 212 in the form of a laminate strip 300 with multiple sections, each including respective primary and secondary transformer windings PW and SW. The laminate structure 212 includes a first side 303 (e.g., the top side) of a laminate structure 212 with conductive (e.g., copper) bond pads 304, as well as an opposite (e.g., bottom) second side 305. As shown in FIG. 4, the laminate strip 300 includes an array of prospective device segments or sections, each having respective primary and secondary transformer windings PW and SW. The section view of FIG. 3 shows one example section with laminate structure openings 306, 307 and 308 that each extend through the laminate structure 212 from the first side 303 to the second side 305.

The example laminate structure 212 includes multiple layers or levels, each including a dielectric material layer. This example also includes conductive features and conductive inter-level vias (not shown) to form conductive primary windings PW and conductive secondary windings SW. The windings PW and SW in one example are spiral winding structures or traces on individual levels of the multi-level laminate structure 212. In one example, one or both respective windings PW and SW extend on multiple levels of the multi-level laminate structure 212. In the example of FIGS. 3 and 4, the individual sections of the laminate structure 212 includes top side bond pads 400 electrically coupled with respective ends of one or both the primary and secondary transformer windings PW and SW to allow bond wire connection to the transformer windings in the finished packaged electronic device 200 (FIG. 2).

Figure 5:
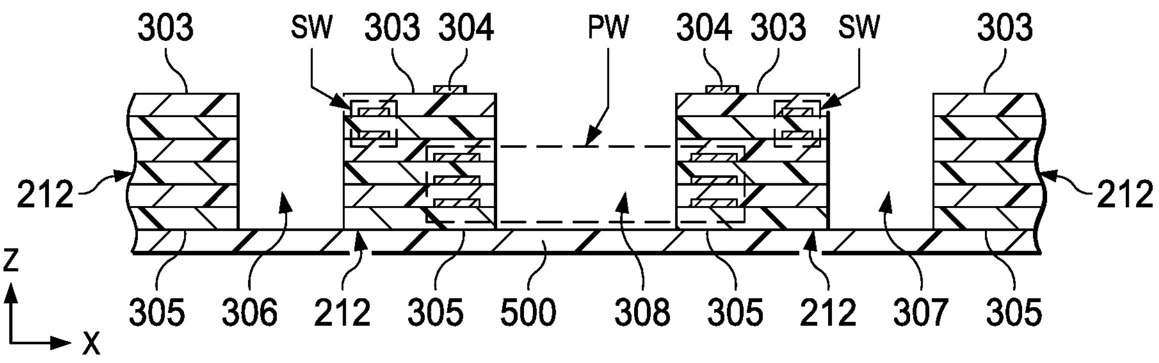
FIG. 5 is a partial sectional side view of the laminate strip positioned on a Teflon plate taken along line 5-5 of FIG. 6.
Figure 6:
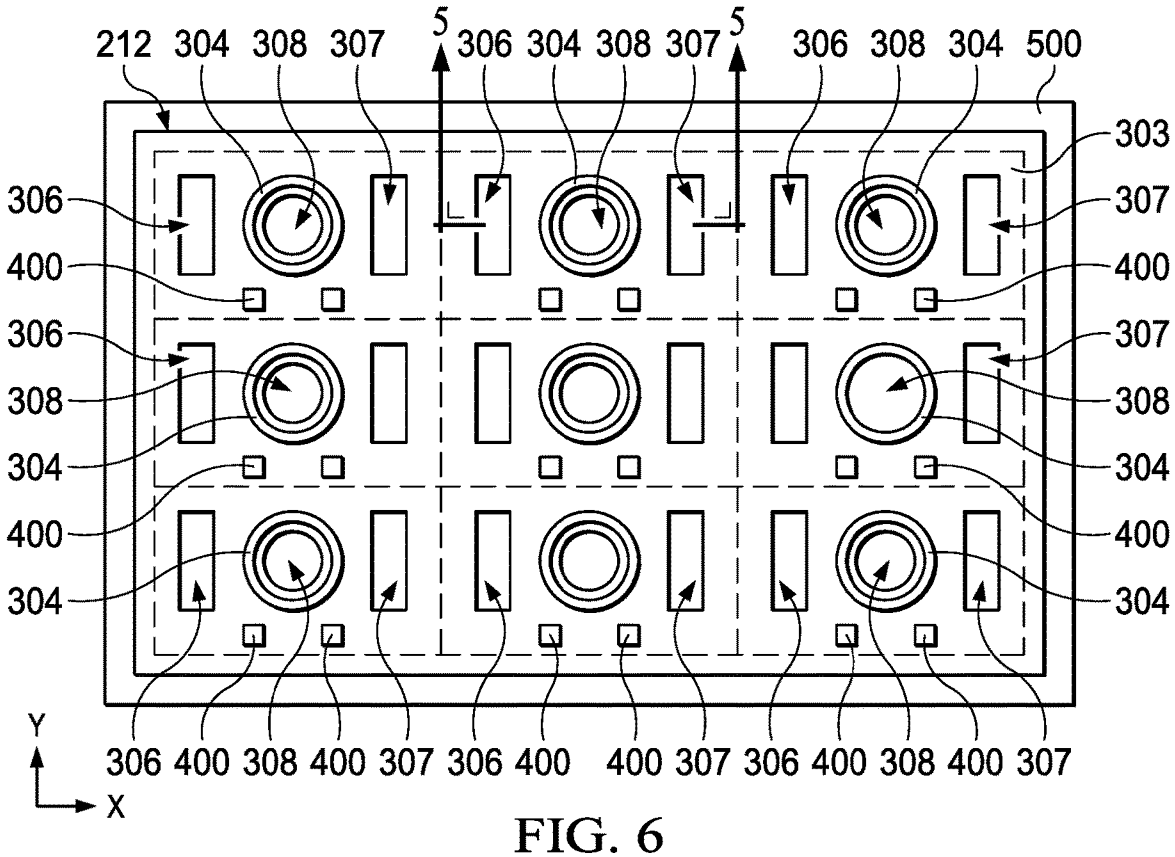
FIG. 6 is a top plan view of the laminate strip of FIG. 5.

FIGS. 5 and 6 show respective sectional side and top views of the laminate structure 212 positioned on a Teflon plate 500 (e.g., at 102 in FIG. 1). The Teflon plate 500 allows printing (e.g., screen printing) of magnetic (e.g., ferrite) paste to fill the openings 306, 307 and 308 of the laminate structure 212 and to form lower ends of the second portion or portions of the top transformer core piece that are generally flush with the second side 305 of the laminate structure 212 after printing and curing and after the Teflon plate 500 has been removed. The resulting second portion has a flat lower side that facilitates joinder to the second (e.g., bottom) transformer core piece (216 in FIG. 2) without air gaps or voids, thereby facilitating improved transformer performance and isolation voltage rating. As shown in the top view of FIG. 6, a single Teflon plate 500 is used for all the device sections of the laminate structure 212 for printing and curing of all the sections concurrently.

Figure 7:
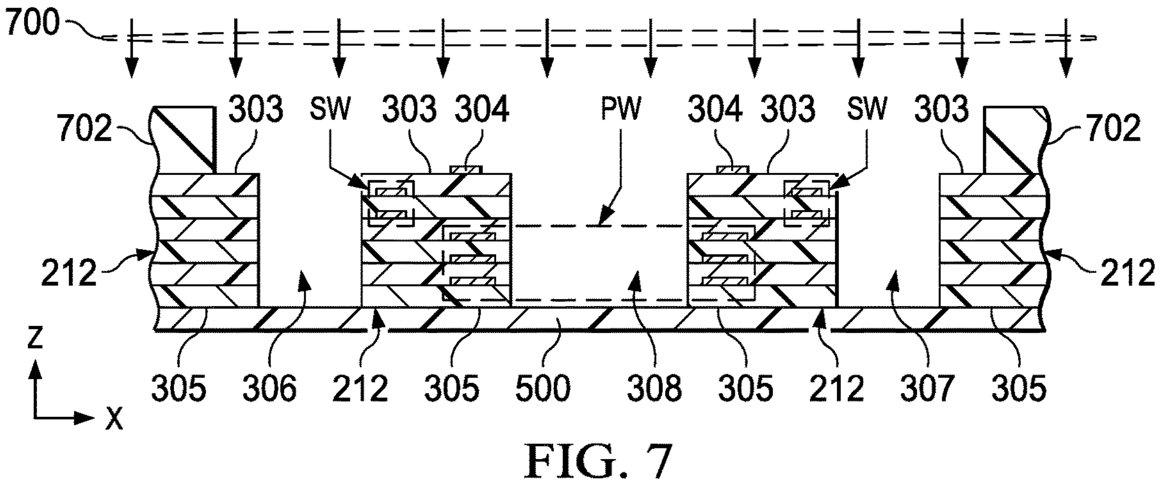
FIG. 7 is a partial sectional side view of a stencil positioned on the laminate strip taken along line 7-7 of FIG. 8.
Figure 8:
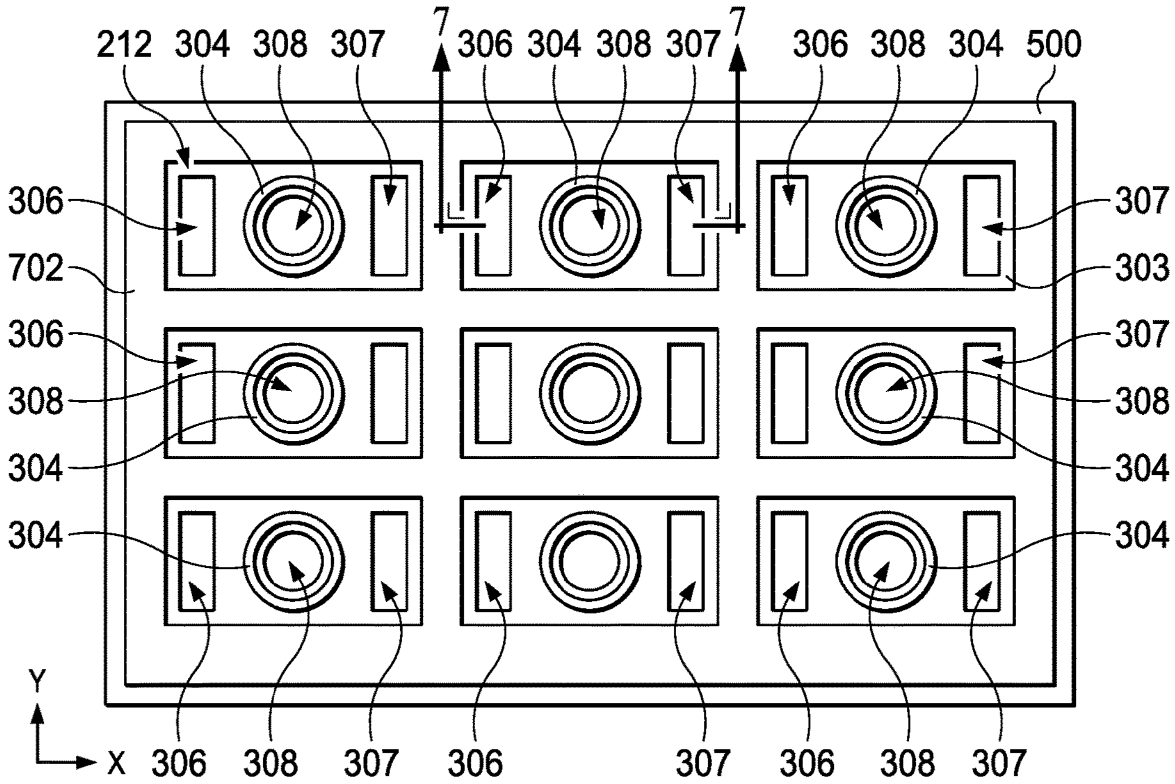
FIG. 8 is a top plan view of the laminate strip and the stencil of FIG. 7.

FIGS. 7 and 8 show respective sectional side and top views of the laminate structure 212 undergoing a process 700 that positions a stencil 702 on portions of the first side 303 of the laminate structure 212. The example stencil 702 covers the bond pads (400 in FIG. 4 above) and exposes portions of the first side 303 and the openings 306, 307 and 308 of the laminate structure 212. The openings of the stencil 702 can be tailored for any desired magnetic paste print coverage for a given design. In one example, the stencil 702 is or includes stainless steel. In another example, the stencil 702 is or includes nylon.

Figure 9:
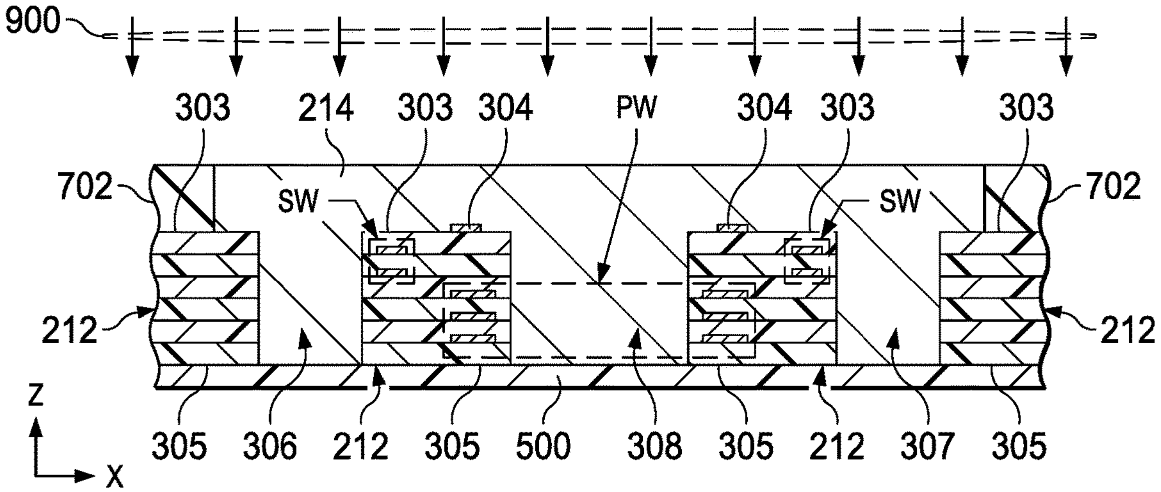
FIG. 9 is a partial sectional side view taken along line 9-9 of FIG. 10 showing the laminate strip undergoing a printing process to deposit magnetic paste into openings in the laminate strip using the stencil.
Figure 10:
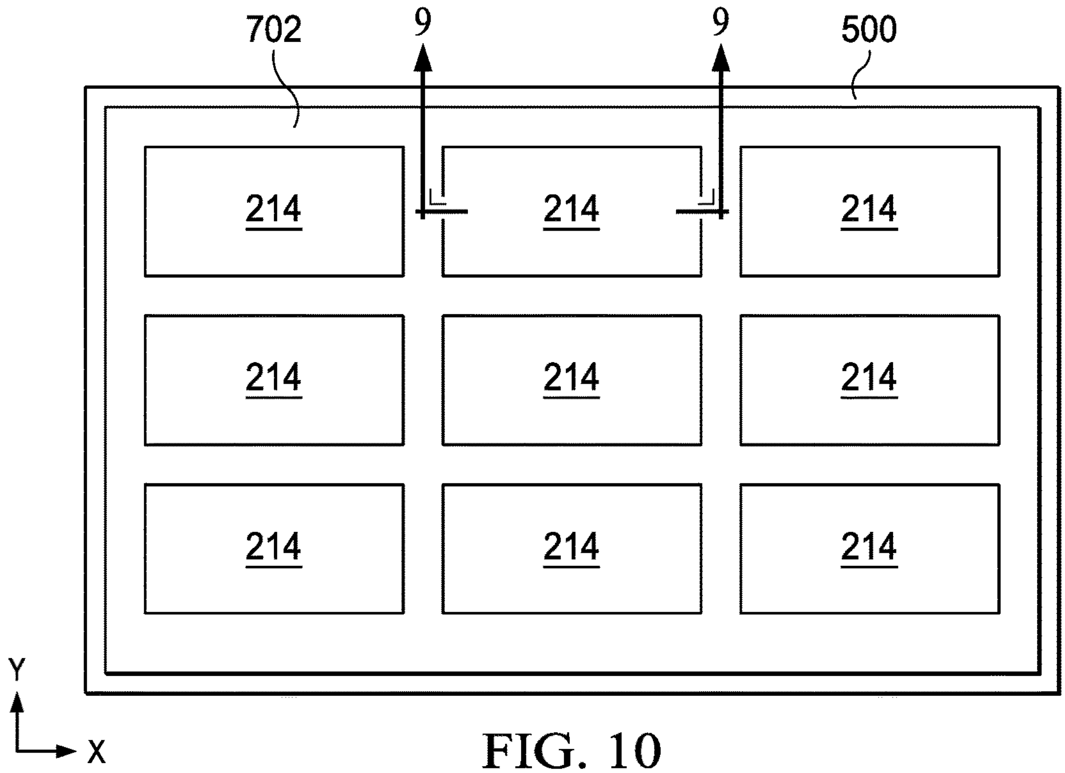
FIG. 10 is a top plan view of the laminate strip of FIG. 9.

FIGS. 9 and 10 show respective sectional side and top views of the laminate structure 212 and the stencil 702 during performance of a printing process 900 (e.g., at 106 in FIG. 1 above). The printing process 900 deposits 106 magnetic paste 214 onto exposed portions of the first side 303 of the laminate structure 212. The printing process also deposits the magnetic paste 214 into the exposed openings 306, 307, and 308. In the illustrated example, the printing process 900 fills the openings 306, 307, and 308 as shown in FIG. 9, and forms substantially flat bottoms of the second portions of the printed magnetic paste 214 within the openings 306, 307, and 308 along the exposed top side of the Teflon plate 500. In the illustrated example, the bottoms of the second portions of the printed magnetic paste 214 in the openings 306, 307, and 308 are substantially planar with the second side 305 of the laminate structure 212.

In one implementation, the printing process 900 is a screen printing or silk screening process that uses a dispensing apparatus (not shown) to dispense or otherwise deposit the magnetic paste 214 onto the first side 303 and into the openings 306, 307, and 308 of the laminate structure 212, preferably to a level above the top of the stencil 702, and a blade or squeegee (not shown) is moved with applied downward pressure across the top side of the stencil 702 (e.g., screen) to fill the open stencil apertures with the printed magnetic paste 214 and create a smooth (e.g., substantially planar) top side of the printed magnetic paste 214.

Figure 11:
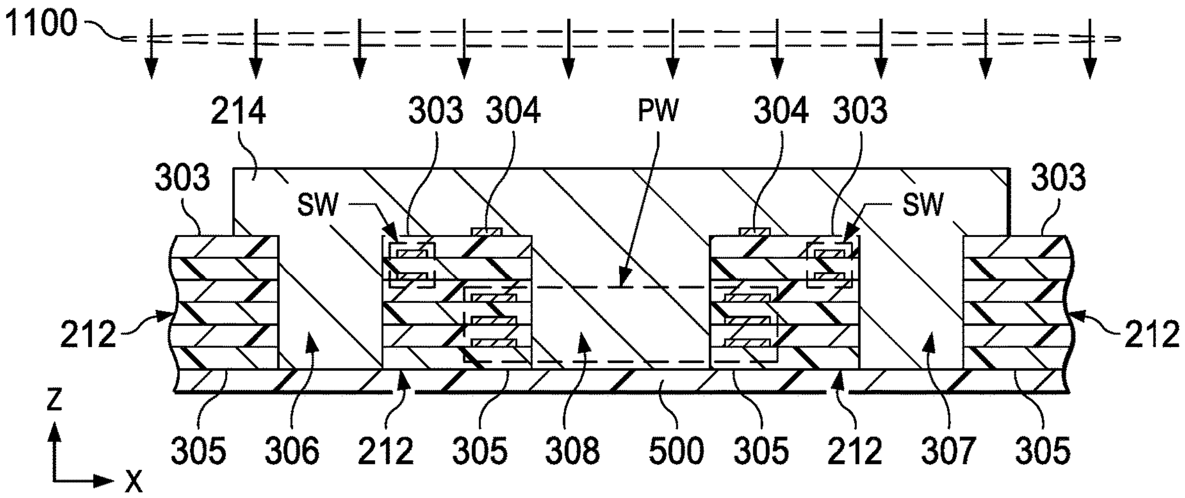
FIG. 11 is a partial sectional side view of the laminate strip and deposited magnetic paste undergoing a thermal curing process with the stencil removed to form a cured upper magnetic core piece.
Figure 12:
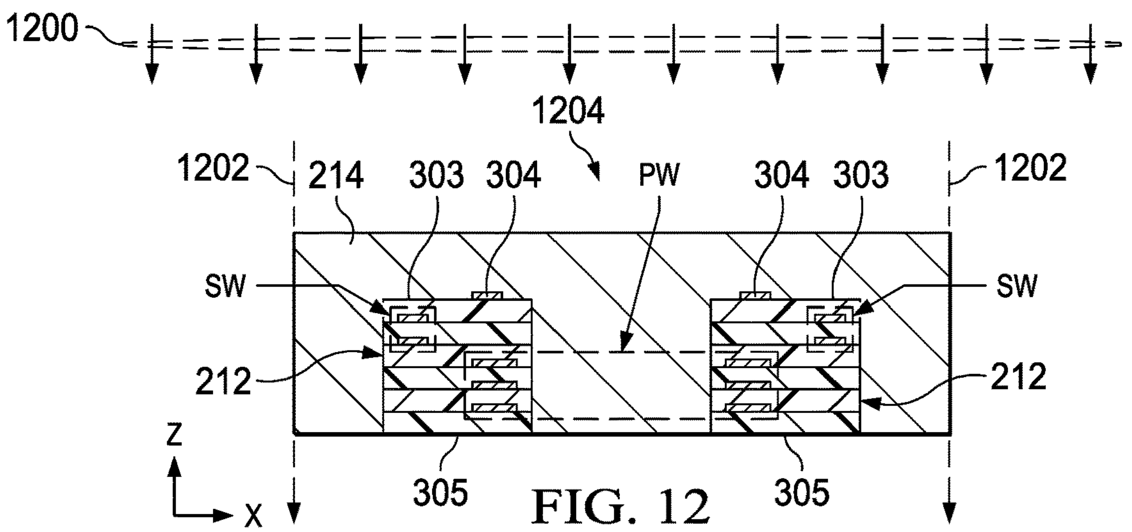
FIG. 12 is a partial sectional side view of the laminate strip and cured upper magnetic core piece undergoing a singulation process to separate individual sections from the laminate strip.

FIG. 11 shows the laminate structure 212 and the printed magnetic paste undergoing a thermal curing process 1100 with the stencil removed (e.g., 108 in FIG. 1 above). The curing process 110 forms the cured first transformer core piece 214 (e.g., FIG. 2 above). The cured first transformer core piece 214 has a first portion that extends along the first side 303 of the laminate structure 212, and second portions that fill the respective openings 306, 307, and 308 of the laminate structure 212. FIG. 12 shows the laminate structure 212 and the cured first transformer core piece 214 undergoing a singulation process 1200 (e.g., at 110 in FIG. 1) that separates individual sections from the laminate strip structure of FIGS. 3-11 and creates a joined upper transformer assembly 1204. In one example, the singulation process 1200 is a saw cutting process. In another example, the singulation process 1200 is a laser cutting process.

Figure 13:
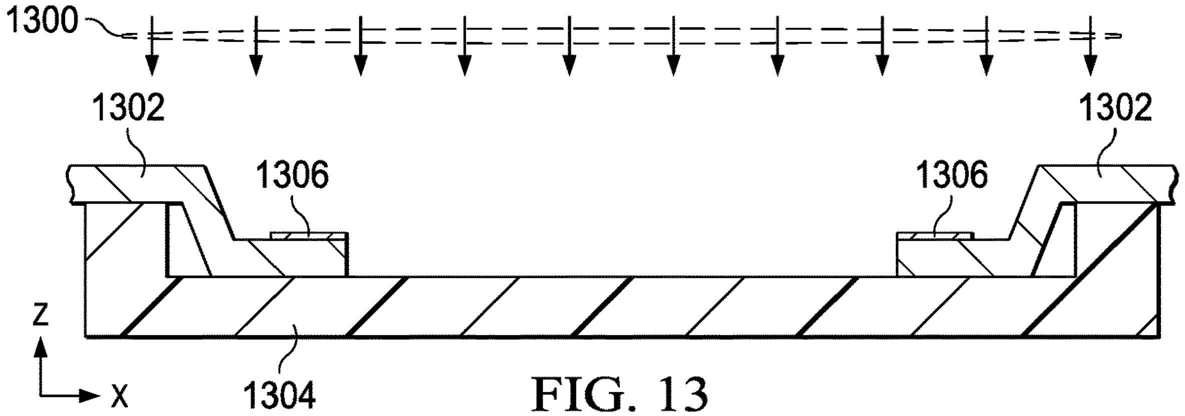
FIG. 13 is a partial sectional side elevation view of a lead frame strip supported in a carrier tray while undergoing a magnetic paste dispense process that deposits magnetic paste on select portions of the lead frame.
Figure 14:
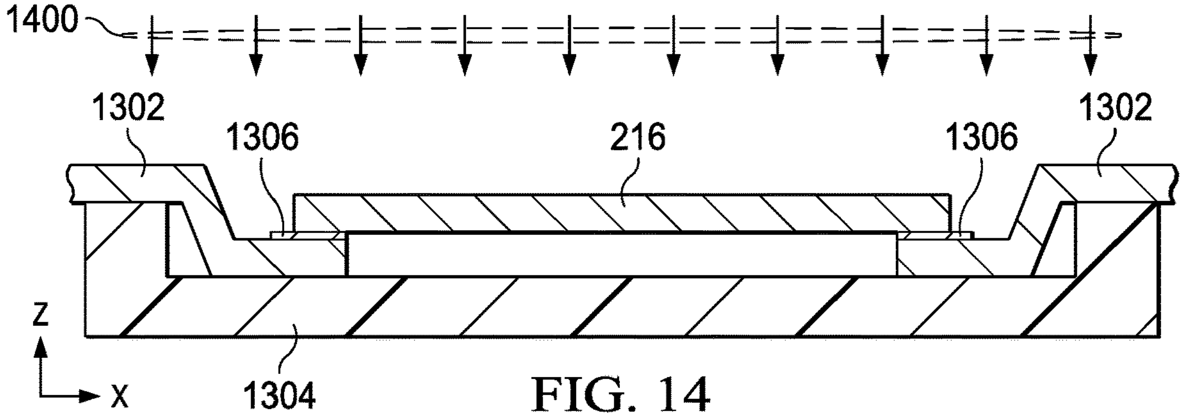
FIG. 14 is a partial sectional side elevation view of the lead frame strip undergoing a process that positions a bottom transformer core piece on the deposited magnetic paste.
Figure 15:
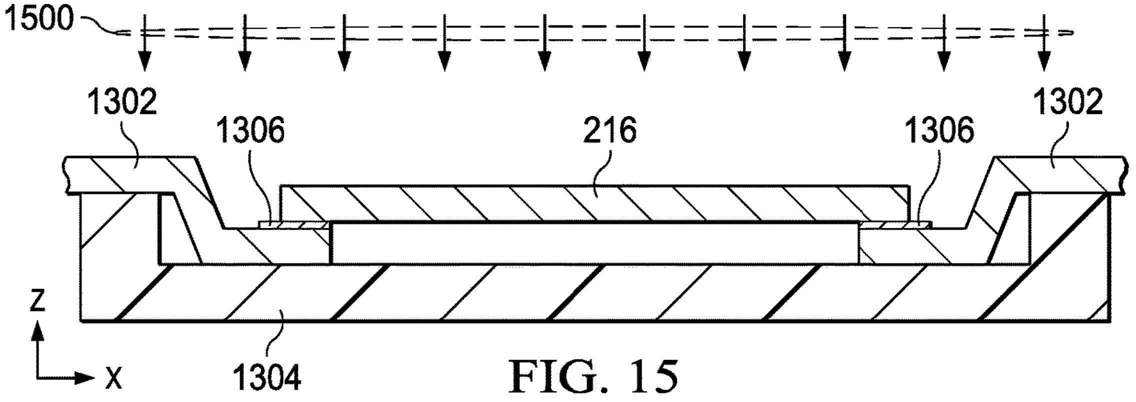
FIG. 15 is a partial sectional side elevation view of the lead frame strip undergoing a thermal curing process to cure the deposited magnetic paste.

FIG. 13 shows a side view of a portion of a lead frame 1302 formed as a strip with multiple device sections. The lead frame 1302 is positioned or supported in a carrier tray 1304 while undergoing a magnetic paste dispense process 1300 that deposits a second magnetic paste 1306 on select portions of the lead frame 1302 (e.g., at 112 in FIG. 1). In one example, the second magnetic paste 1306 is the same material used to print the first transformer core piece 214. FIG. 14 shows the lead frame strip undergoing a process 1400 that positions the second transformer core piece 216 on the deposited second magnetic paste 1306 on a portion of the top side of the lead frame 1302 (e.g., at 114 in FIG. 1). FIG. 15 shows the lead frame strip undergoing a thermal curing process 1500 (e.g., at 116 in FIG. 1) that cures the deposited second magnetic paste 1306 to join the bottom side of the second transformer core piece 216 to the lead frame 1302.

Figure 16:
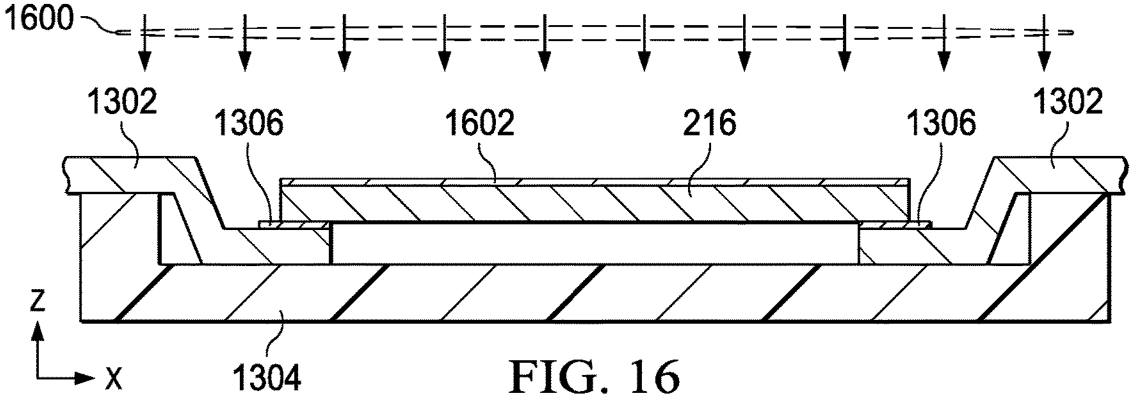
FIG. 16 is a partial sectional side elevation view of the lead frame strip and the positioned bottom transformer core piece undergoing a magnetic paste dispense process that deposits magnetic paste on select portions of the top side of the positioned bottom transformer core piece.
Figure 17:
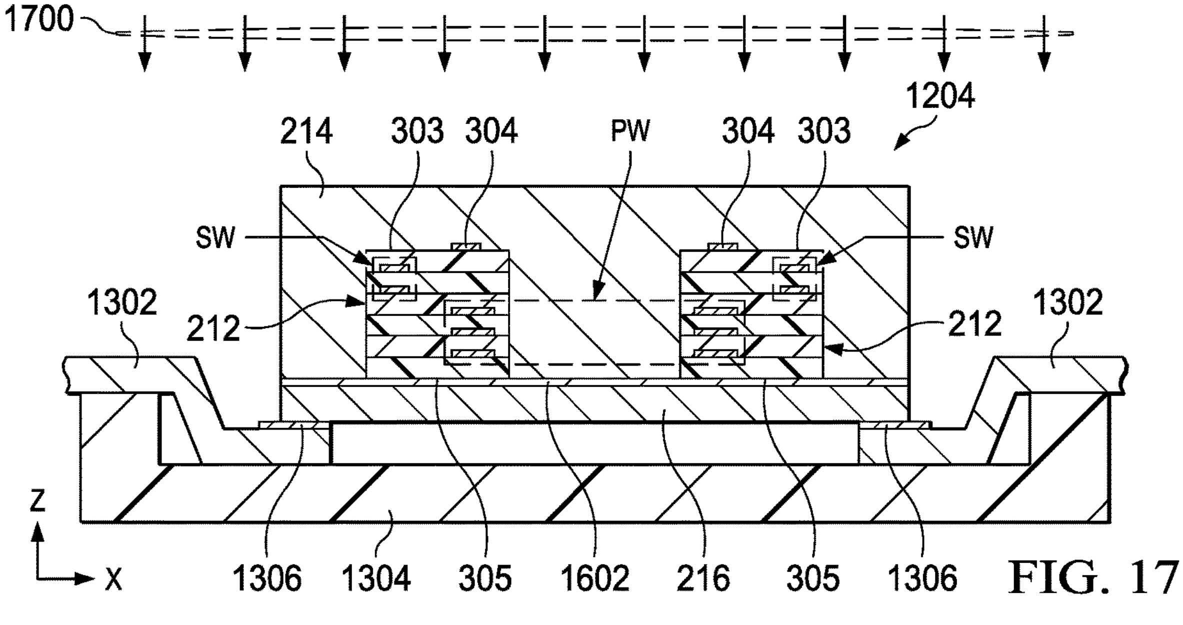
FIG. 17 is a partial sectional side elevation view of the assembled lead frame strip and positioned bottom transformer core piece undergoing a process that positions the assembled upper magnetic core piece and laminate piece onto the top side of the bottom transformer core piece.
Figure 18:
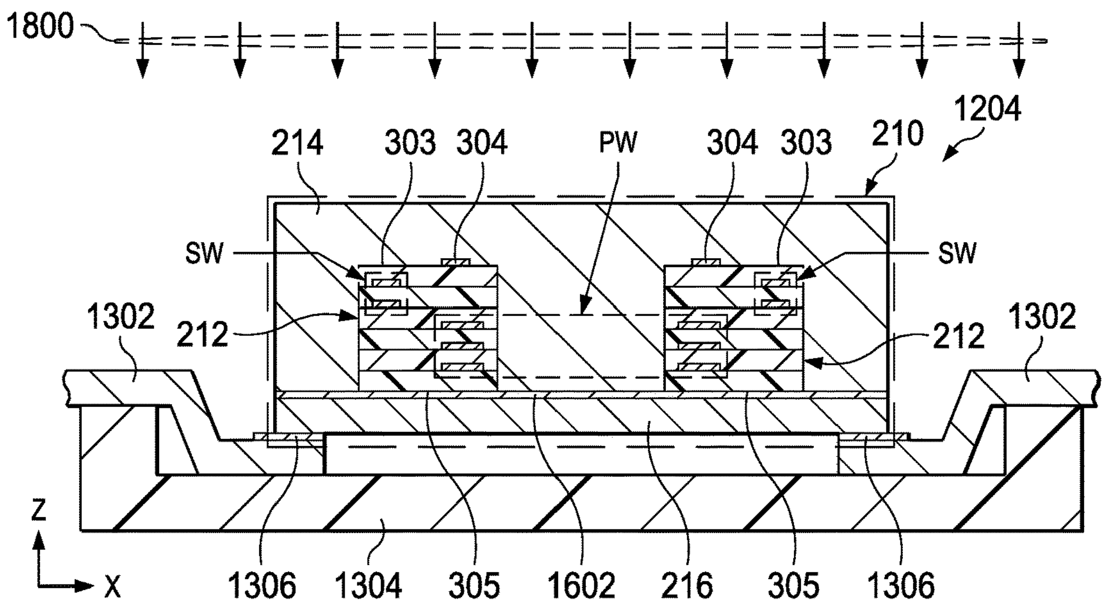
FIG. 18 is a partial sectional side elevation view of the lead frame strip and the positioned top and bottom transformer core pieces undergoing a thermal curing process to cure the deposited magnetic paste to form a transformer with an E-I core structure.

FIGS. 16-18 show example processing to join the second transformer core piece 216 to the second side (e.g., bottom side) of the second portions of the first transformer core piece 214. The joining processing in this example also joins the top of the second transformer core piece 216 to the bottom or second side 305 of the laminate structure 212. FIG. 16 shows the lead frame 1302 and the positioned second transformer core piece 216 undergoing a magnetic paste dispense process 1600 that deposits magnetic paste 1602 on select portions of the first side (e.g., top side) of the positioned bottom transformer core piece 216 (e.g., at 118 in FIG. 1 above). In one example, the magnetic paste 1602 is the same material used to print the first transformer core piece 214.

The processing continues in FIG. 17, which shows the assembled lead frame 1302 and positioned second transformer core piece 216 undergoing a process 1700 (e.g., at 120 in FIG. 1) that positions the assembled first transformer core piece 214 and the second (e.g., bottom) side 305 of the associated laminate piece 212 onto the first (e.g., top) side of the second transformer core piece 216 (e.g., on the dispensed magnetic paste 1602). In one example, the process 1700 uses pick and place apparatus (not shown) to position the first transformer core piece 214 and the laminate structure piece 212 onto the second transformer core piece 216. FIG. 18 shows the lead frame 1302 and the first and second transformer core pieces 214 and 216 undergoing a thermal curing process 1800 (e.g., at 122 in FIG. 1). The process 1800 cures the magnetic paste 1602 to join the second transformer core piece 216 to the side of the second portion of the first transformer core piece 214, and also joins the second side 305 of the laminate structure 212 to the second transformer core piece 216, to form the transformer 210.

The transformer 210 includes the laminate structure 212 with the first side 303 and the opposite second side 305, as well as the first transformer core piece 214 formed of cured magnetic paste. The first transformer core piece 214 has the first portion that extends along the first side 303 of the laminate structure 212, and the second portion that fills the opening 308 of the laminate structure 212. The closed magnetic circuit also includes the second transformer core piece 216 that extends along the lower side of the second portions of the E-shaped first transformer core piece 214. The magnetic circuit also includes the cured magnetic paste 1602 between the first side of the second transformer core piece 216 and the bottom sides of the second portions of the first transformer core piece 214. The transformer 210 in FIG. 18 is then processed for wire bonding, for example, to connect the bond wires 218 in FIG. 2 above, and the device is molded to form the molded package structure 202 of FIG. 1 to provide an integrated transformer electronic device 200.

Figure 19:
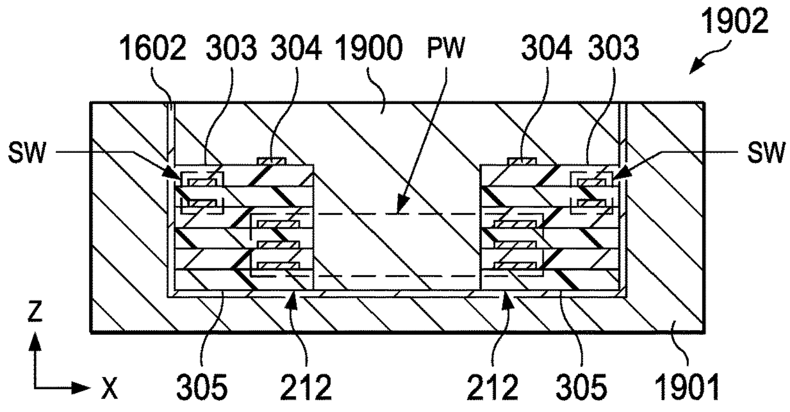
FIG. 19 is a partial sectional side elevation view of a transformer with a U-T core structure.
Figure 20:
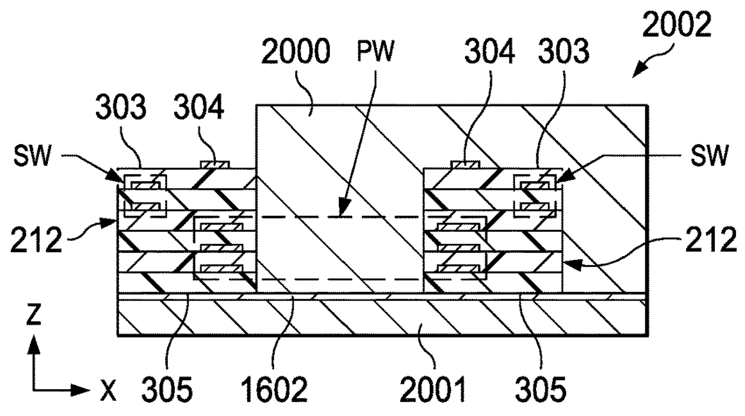
FIG. 20 is a partial sectional side elevation view of a transformer with a U-I core structure.

FIG. 19 shows another example transformer 1902 with a U-T core structure having a T-shaped first transformer core piece 1900. In this example, the laminate structure 212 is as described above, and a U-shaped second transformer core piece 1901 is positioned as shown and joined by cured magnetic paste 1602. FIG. 20 shows a further example transformer 2002 with a U-I core structure. This example includes a first transformer core piece 2000 with a U-shape, a laminate structure 212 as described above with windings PW and SW that encircle one vertical leg of the first transformer core piece 2000, and a generally flat (e.g., I-shaped) second transformer core piece 2001.

The described example transformers and packaged electronic devices provide efficient closed magnetic loop structures, such as E-I, U-I, T-U-shaped transformer core piece structures, while mitigating or avoiding air gaps or other voids to provide a small reluctance path for the transformer magnetic circuit. These examples and the fabrication method 100 reduce leakage flux and increase the transformer quality factor and inductance density, particularly compared to using non-magnetic interconnecting material to bond two pieces of E-I, U-I, or T-U shaped cores, through alternative integration methods which use screen printed magnetic paste to serve as E, or T or U-shaped core piece of the transformer and mitigate or eliminate voids in the closed loop transformer structures. The described method 100 facilitates consistent isolation performance and reliability by mitigating voids through the screen-printing assembly process. The described structures and methods also reduce manufacturing cost by reducing or eliminating fabrication yield loss previously associated with voids introduced when joining or assembling transformer core pieces. Moreover, the screen-printing process can easily vary the feed material (e.g., ferrite particles in the printed magnetic paste) allowing fine tuning of the properties of the magnetic pastes for new applications, for example, to provide high relative permeability, low loss transformer core pieces with high breakdown voltage, proper viscosity for screen printing as well as dispensing, and high resistivity using feed material mixtures to make magnetic composite into ink, or powder paste form or magnetic paste with ferrite particles to eliminate or mitigate voids in the magnetic circuit path and ensure the desired isolation performance and mechanical reliability of the isolated closed magnetic loop transformer. In certain examples, the printing at 106 in FIG. 1 uses Ajinomoto screen printed magnetic paste (AMP) to fill the openings 306, 307, and 308 of the laminate structure 212. In certain example, the magnetic past of the first transformer core piece 214, 1900, 200 includes Ferrite particles such as NiZn ferrite, MnZn ferrite and NiCuZn selected to formulate the magnetic paste for isolated closed loop transformer fabrication. The particle size in one example is in the range of a few hundred nanometers to tens of micrometers to facilitate screen printing using existing printing apparatus and systems. The main magnetic properties of one example of the paste after curing, such as permeability, is around 5-40. The properties mainly depend on the composition and particle size of the magnetic paste in certain implementations. The peak curing temperature in one example is less than 250 degrees C., which varies with epoxy resin used for the magnetic paste. The described examples provide a low cost solution to isolation and reliability performance in miniature isolated closed magnetic loop transformers by reducing or avoiding voids trapped in interconnecting layers by screen printing the magnetic pastes to form a T, E or U-shaped core piece.

Modifications are possible in the described examples, and other implementations are possible, within the scope of the claims.

What is claimed is:

1. A transformer, comprising:

a laminate structure having: a first side, an opposite second side, an opening that extends from the first side of the laminate structure to the second side of the laminate structure, and windings that encircle the opening;

a first transformer core piece having: a first portion that extends along the first side of the laminate structure, and a second portion that fills the opening of the laminate structure, the first transformer core piece comprising a cured magnetic paste; and a second transformer core piece along a side of the second portion of the first transformer core piece.

2. The transformer of claim 1, further comprising a cured magnetic paste between a first side of the second transformer core piece and the side of the second portion of the first transformer core piece.

3. The transformer of claim 1, wherein the first transformer core piece has an E-shape.

4. The transformer of claim 1, wherein the first transformer core piece has a T-shape.

5. The transformer of claim 1, wherein the first transformer core piece has a U-shape.

6. An electronic device, comprising:

a transformer, comprising: a laminate structure; a first transformer core piece; and a second transformer core piece; the first transformer core piece comprising: a cured magnetic paste, a first portion that extends along a side of the laminate structure, and a second portion that fills an opening of the laminate structure; the second transformer core piece extending along a side of the second portion of the first transformer core piece; the laminate structure comprising windings that encircle the opening;

a package structure that encloses the transformer; and conductive leads electrically coupled to the transformer.

7. The electronic device of claim 6, the electronic device further comprising a cured magnetic paste between a first side of the second transformer core piece and the side of the second portion of the first transformer core piece.

8. The electronic device of claim 6, wherein the first transformer core piece has an E-shape.

9. The electronic device of claim 6, wherein the first transformer core piece has a T-shape.

10. The electronic device of claim 6, wherein the first transformer core piece has a U-shape.

11. An electronic device, comprising:

a laminate structure having an opening from a first side to a second side;

windings encircle the opening between first and second sides of the laminate structure;

a first portion of cured magnetic paste extending along the first side of the laminate structure and filling the opening;

a second portion of cured magnetic paste extending along the second side of the laminate structure;

a package structure that encloses the laminate structure and the first and second portions of cured magnetic paste; and conductive leads electrically coupled to the laminate structure.

12. The electronic device of claim 11, the electronic device further comprising a third portion of cured magnetic paste between the first portion of cured magnetic paste and the second portion of cured magnetic paste.

13. The electronic device of claim 12, wherein the first cured magnetic paste has an E-shape.

14. The electronic device of claim 12, wherein the first cured magnetic paste has a T-shape.

15. The electronic device of claim 12, wherein the first cured magnetic paste has a U-shape.

16. The electronic device of claim 12, further including at least one additional opening between the first and second sides of the laminate structure.

17. The electronic device of claim 16, wherein the first portion of cured magnetic paste fills the at least one additional opening.

18. The electronic device of claim 12, further including at least two additional openings between the first and second sides of the laminate structure.

19. An electronic device, comprising:

a laminate structure having an opening from a first side to a second side;

windings encircle the opening between first and second sides of the laminate structure;

a first portion of cured magnetic paste extending along the first side of the laminate structure and filling the opening, wherein first portion of cured magnetic paste fills the at least two additional openings;

a second portion of cured magnetic paste extending along the second side of the laminate structure;

a third portion of cured magnetic paste between the first portion of cured magnetic paste and the second portion of cured magnetic paste;

a package structure that encloses the laminate structure and the first and second portions of cured magnetic paste; and conductive leads electrically coupled to the laminate structure.

20. The electronic device of claim 19, wherein the first cured magnetic paste has an E-shape.

21. The electronic device of claim 19, wherein the first cured magnetic paste has a T-shape.

22. The electronic device of claim 19, wherein the first cured magnetic paste has a U-shape.

23. The electronic device of claim 19, further including at least one additional opening between the first and second sides of the laminate structure.

24. The electronic device of claim 23, wherein the first portion of cured magnetic paste fills the at least one additional opening.

25. The electronic device of claim 19, further including at least two additional openings between the first and second sides of the laminate structure.

* * * * *